July 27, 1965
E. J. KELLY
3,196,623
SYSTEMS FOR STORING PRODUCTS IN THE LIQUID PHASE
THAT ARE NORMALLY IN THE GAS PHASE
Filed Dec. 20, 1962
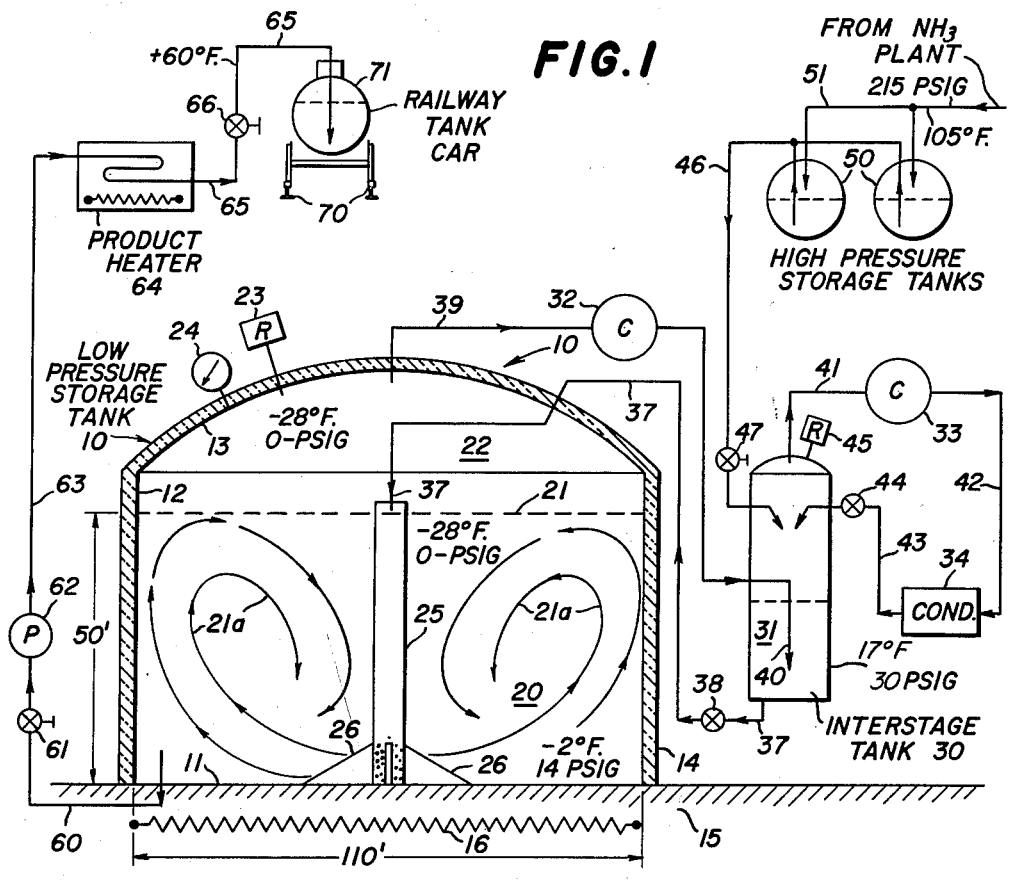
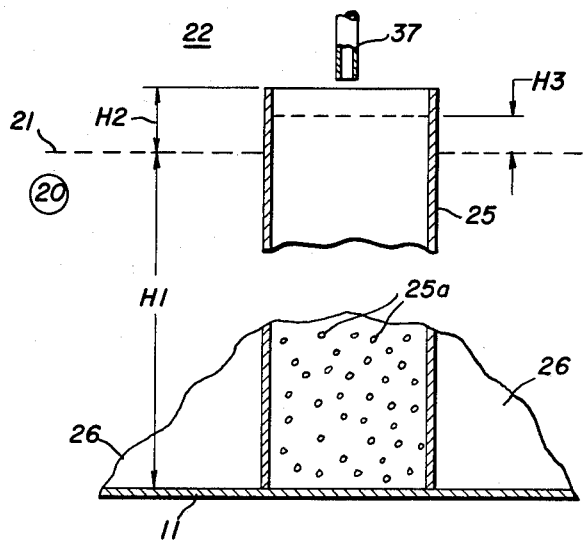
INVENTOR.
EDGAR J. KELLY
BY
Brangley, Baird, Clayton,
McLean & Vogel,
ATTYS United States Patent Office 3,196,623
Patented July 27, 1965

3,196,623
SYSTEMS FOR STORING PRODUCTS IN THE LIQ-
UID PHASE THAT ARE NORMALLY IN THE GAS
PHASE
Edgar J. Kelly, Lake Zurich, Ill., assignor to General
American Transportation Corporation, Chicago, Ill., a
corporation of New York
Filed Dec. 20, 1962, Ser. No. 246,108
7 Claims. (Cl. 62—54)

The present invention relates to systems for storing products in the liquid phase that are in the gas phase under atmospheric pressure and ambient temperature conditions, and particularly to such systems for storing anhydrous liquid ammonia.

A conventional system for storing anhydrous liquid ammonia comprises a heat-insulated storage tank containing the body of liquid ammonia, and a compressor for withdrawing from the top of the tank gaseous ammonia evolved from the stored body of liquid ammonia, thereby to maintain an equilibrium low pressure in the top of the tank above the top surface of the stored body of liquid ammonia in order to effect evaporation of gaseous ammonia therefrom with the resulting cooling of the stored body of liquid ammonia to a corresponding relatively low temperature. The compressed gaseous ammonia from the compressor is cooled externally of the tank to effect condensation thereof; and the resulting warm liquid ammonia is then returned to the tank; which refrigerating cycle is effected continuously, or intermittently, as required, to maintain the desired relatively low pressure of the gaseous ammonia in the top of the tank. Of course, the top surface of the stored body of liquid ammonia is maintained at a corresponding equilibrium temperature, and the remainder of the stored body of liquid ammonia is cooled to a somewhat higher temperature by conduction, convection currents, etc.

In the system, the storage tank is of substantial height, whereby the stored body of liquid ammonia has a substantial head, with the result that a susbtantial gauge pressure exists therein adjacent to the bottom of the tank, alhough the top surface of the stored body of liquid ammonia may be at 0 gauge pressure. This, of course, gives rise to the circumstances that the equilibrium temperatures of the stored body of liquid ammonia are respectively relatively low and relatively high at the top and at the bottom thereof and that the densities of the stored body of liquid ammonia are respectively relatively high and relatively low at the top and at the bottom thereof; whereby the stored body of liquid ammonia is subject to "surging." In other words, upon occasion, the stored body of liquid ammonia releases suddenly a great quantity of gaseous ammonia that rises to the top of the tank, which causes a sudden increase in the gauge pressure in the top of the tank. This occurrence effects opening of the pressure relief valve provided in communication with the top of the tank and causes overloading of the associated compressor and related refrigeration equipment. While the opening of the pressure relief valve normally prevents severe damage to the storage tank, it occasions substantial loss to the atmosphere of valuable gaseous ammonia.

Such surging of the stored body of liquid ammonia is not only highly objectionable for the reasons noted above, but the same is also unpredictable, so that there is no way in which any operating condition of the system may be altered or changed in anticipation of surging of the stored body of liquid ammonia. Further, there is no particular operating condition of the system that can be altered or changed quickly enough to prevent such surging; whereby heretofore surging has been accepted simply as an objectionable operating characteristic of such storage systems.

Accordingly, it is a general object of the present invention to provide in a storage system of the character described, facility for preventing, or at least greatly minimizing, surging of the body of product that is stored in the liquid phase under relatively low temperature conditions.

Another object of the invention is to provide in a storage tank adapted to contain a body of product in the liquid phase, wherein the product is in the gas phase under atmospheric pressure and ambient temperature conditions, an improved arrangement for producing gentle circulation of the stored body of product from the bottom of the tank toward the top thereof so as to minimize surging of the stored liquid product.

A further object of the invention is to provide in a system for storing anhydrous liquid ammonia, a storage tank including improved facility for accommodating the introduction of the liquid ammonia thereinto and for producing gentle circulation of the whole body of stored liquid ammonia as a consequence of the introduction thereof.

A still further object of the invention is to provide, in an anhydrous liquid ammonia storage system, a field storage tank of improved and simplified construction and arrangement.

Further features of the invention pertain to the particular arrangement of the elements of the storage system and of the elements of the storage tank incorporated therein, whereby the above-outlined and additional operating features thereof are attained.

The invention, both as to its organization and method of operation, together with further objects and advantages thereof, will best be understood by reference to the following specification, taken in connection with the accompanying drawing, in which:

FIGURE 1 is a diagrammatic illustration of a system for storing products in the liquid phase that are in the gas phase under atmospheric pressure and ambient temperature conditions, and incorporating a field storage tank; and FIG. 2 is a greatly enlarged fragmentary vertical sectional view of the central portion of the field storage tank.

Referring now to FIG. 1 of the drawing, the storage system there illustrated, and embodying the features of the present invention, is especially adapted for use in the storage of anhydrous liquid ammonia; which system essentially comprises a field storage tank 10 of large volume and including a substantially disk-shaped bottom wall 11, an upstanding substantially cylindrical side wall 12, and a convex substantially dome-shaped top wall 13. The component elements of the tank 10 are ordinarily formed of steel and, of course, the tank 10 is fluid-tight. The side wall 12 and the top wall 13 are provided with a suitable heat-insulating jacket, indicated at 14, that may be formed of conventional materials in the usual manner; which materials must also be highly resistant to the elements of weather, since the tank 10 is ordinarily a field storage tank, as previously noted. The bottom wall 11 of the tank 10 is usually supported directly upon an earth foundation, as indicated at 15; and normally a heater 16 is arranged in the foundation 15 and adapted to supply heat into the bottom wall 11 to prevent freezing of the subsoil and subsequent heaving of the soil because of ice formation.

The tank 10 is adapted to contain a body of anhydrous liquid ammonia, indicated at 20, the maximum level of which is indicated at 21; which level 21 is well below the top wall 13 so as to provide a chamber 22 therebetween and immediately below the top wall 13. Also, the tank 10 is provided with the usual instrumentation, including a pressure relief valve 23 and a pressure gauge 24, both communicating with the chamber 22. Also, an upstanding tube 25 is arranged generally in the central portion of the tank 10 and provided with an open top end projecting somewhat above the maximum level 21 of the contained body 20 of anhydrous ammonia and communicating with the chamber 22. The bottom end of the tube 25 may be supported directly upon the top surface of the bottom wall 11 and closed thereby; and the lower end of the tube 25 is firmly anchored in place by a plurality of gussets 26 rigidly secured thereto in angular spaced-apart relation and also rigidly secured to the adjacent portions of the bottom wall 11. Further, a plurality of passages, indicated at 25a, are formed through the lower portion of the tube 25; which passages 25a communicate between the interior of the lower portion of the tube 25 and the interior of the tank 10 adjacent to the bottom wall 11; and which passages 25a are employed for a purpose more fully explained hereinafter.

Further, the system comprises an upstanding interstage tank 30 that is adapted to contain a body of anhydrous liquid ammonia, indicated at 31, a main compressor 33, and a condenser 34. The bottom of the interstage tank 30 is connected to a pipe 37 that contains an expansion valve 38; which pipe 37 projects through the top wall 13 of the tank 10 and then extends downwardly through the chamber 22 and terminates in an open end disposed directly above the open top end of the tube 25 and in facing relation therewith. As best shown in FIG. 2, an air gap or break is arranged between the open bottom end of the pipe 37 and the open top end of the tube 25 within the chamber 22 in the top of the tank 10. The chamber 22 in the tank 10 is connected by a pipe 39 to the inlet of a booster compressor 32; and the outlet of the booster compressor 32 is connected to a pipe 40 that extends into the interstage tank 30 and terminates adjacent to the bottom thereof. The top of the interstage tank 30 is also connected by a pipe 41 to the inlet of the main compressor 33; the outlet of the main compressor 33 is connected by a pipe 42 to the inlet of the condenser 34 that may be of any suitable type; and the outlet of the condenser 34 is connected by a pipe 43 to the upper portion of the interstage tank 30, the pipe 43 containing an expansion valve 44. Finally, the top of the interstage tank 30 is also provided with a pressure relief valve 45; and the upper portion of the interstage tank 30 communicates with a supply pipe 46 that contains a manually operable control valve 47.

The system further comprises a plurality of high pressure storage tanks 50 that are supplied with the anhydrous liquid ammonia by a supply pipe 51 that extends to an anhydrous liquid ammonia production plant, not shown; and also the high pressure storage tanks 50 are connected to the supply pipe 46 extending to the interstage tank 30. The bottom of the storage tank 10 communicates with a pipe 60 that includes a manually operable control valve 61 and that extends to the inlet of a pump 62; the outlet of the pump 62 is connected by a pipe 63 to the inlet of a product heater 64 of any suitable type; and the outlet of the product heater 64 is connected to a supply pipe 65 that contains a manually operable control valve 66. Finally, the system comprises a railway track, indicated at 70, that supports a railway tank car 71 that is operatively associated with the supply pipe 65; whereby the railway tank car 71 may be filled with the anhydrous liquid ammonia after warming thereof in the product heater 64, as explained more fully below.

Considering now the general mode of operation of the system, it may be assumed that the bodies 20 and 31 of anhydrous liquid ammonia are respectively contained in the tanks 10 and 30, that anhydrous liquid ammonia is also contained in the tanks 50 and that additional anhydrous liquid ammonia is available in the adjacent production plant, not shown. As heat leaks into the tank 10, some of the liquid ammonia is evaporated from the contained body 20 and resulting gaseous ammonia rises into the chamber 22. The operating booster compressor 32 withdraws the gaseous ammonia from the chamber 22 via the pipe 39, so as to maintain a relatively low pressure of the gaseous ammonia in the chamber 22. The compressed gaseous ammonia is discharged from the booster compressor 32 via the pipe 40 into the body 31 of liquid ammonia contained in the interstage tank 30 so as to effect cooling thereof and the consequent liquefaction of the cooled compressed gaseous ammonia in the interstage tank 30. In turn, liquid ammonia from the body 31 contained in the interstage tank 30 is supplied via the pipe 37 and through the expansion valve 38 and into the open top end of the tube 25. This liquid ammonia is relatively warm and under relatively high pressure, whereby a first portion thereof immediately flashes in the gap between the open bottom end of the pipe 37 and the open top end of the tube 25, and also in the open top end of the tube 25, into gaseous ammonia that rises into the chamber 22. This flashing of the first mentioned portion of the supplied liquid ammonia effects cooling of a second portion thereof; whereby the second-mentioned portion of the supplied liquid ammonia falls in liquid form into the top of the tube 25 effecting the build-up therein of a differential head of the liquid ammonia in the top of the tube 25 above the level 21 of the contained body 20 of liquid ammonia, so that the liquid ammonia in the top of the tube 25 flows downwardly therethrough and from the lower portion thereof and via the passages 25a over the bottom wall 11 so as to induce circulation of the liquid ammonia in the body 20 and upwardly therein and toward the level 21 thereof adjacent to the chamber 22, as indicated by the flow lines 21a in FIG. 1. The action will be readily understood from an examination of FIG. 2, wherein it is illustrated that the maximum head of the body 20 of liquid ammonia contained in the tank 10 may be H1; however, the open top end of the tube 25 projects upwardly above the maximum level 21 by the distance H2; and the liquid ammonia contained in the upper portion of the tube 25 may stand above the maximum level 21 by the distance H3. Accordingly, the column of liquid ammonia in the tube 25 is higher than the column of liquid ammonia in the tank 10, whereby a preferential hydrostatic pressure exists in the lower portion of the tube 25, thereby forcing the liquid ammonia from the lower portion of the tube 25 through the passages 25a therein, in an obvious manner. The passages are generally radially directed, so that outwardly directed currents of the liquid ammonia proceed from the passages 25a over the bottom wall 11 in order to effect circulation of the liquid ammonia in the body 20 in the manner described above. This circulation of the liquid ammonia in the body 20 upwardly therein and toward the maximum level 21 sweeps stagnant pockets of the contained body 20 having a temperature condition substantially above that of the average relatively lower temperature of the body 20 therefrom and toward the maximum level 21, whereby these relatively high temperature pockets of the liquid ammonia may readily undergo evaporation adjacent to the surface or level 21 of the body 20 and into the chamber 22. This arrangement prevents the previously mentioned objectionable surging of gaseous ammonia from the body 20 of liquid ammonia, so as to prevent undesirable pressure surges in the chamber 22. Of course, the prevention of pressure surges in the chamber 22 minimizes operation of the pressure relief valve 23 and the consequent loss of valuable gaseous ammonia to the atmosphere.

Continuing with the general mode of operation of the system, the liquefying of the compressed gaseous ammonia in the body 31 of liquid ammonia contained in the interstage tank 30 causes evaporation of gaseous ammonia therefrom, whereby the gaseous ammonia rises into the top of the interstage tank 30 and is withdrawn via the pipe 41 into the main compressor 33. The compressed gaseous ammonia is delivered from the main compressor 33 via the pipe 42 into the condenser 34, wherein heat is extracted therefrom so as to effect condensation and liquefaction thereof in a well-known manner. The hot liquid ammonia passes from the condenser 34 via the pipe 43 and thence via the expansion valve 44 and ultimately into the upper portion of the interstage tank 30. Of course, a part of the liquid ammonia thus supplied into the upper portion of the interstage tank 30 is flashed to produce gaseous ammonia that rises into the top of the interstage tank 30. Another part of the liquid ammonia thus supplied into the upper portion of the interstage tank 30 is cooled by the above-mentioned flashing, whereby the same falls into the body 31 contained in the interstage tank 30 so as to replenish the body 31 of liquid ammonia contained in the interstage tank 30.

Considering now the filling of the railway tank car 71 with liquid ammonia from the system, the pipe 65 is first attached to the dome of the railway tank car 71, the valves 66 and 61 are opened, and operation of the pump 62 is initiated. Thus, the cold liquid ammonia from the contained body 20 in the storage tank 10 is delivered via the pipe 60 to the pump 62 and forced therefrom via the pipe 63 through the product heater 64 and thence into the pipe 65 from which the liquid ammonia is delivered into the railway tank car 71. In the product heater 64 the temperature of the liquid ammonia is suitably elevated for delivery into the railway tank car 71 in a well-known manner. After filling of the railway tank car 71 with the liquid ammonia, the valves 66 and 61 are closed and operation of the pump 62 is arrested. Then the pipe 65 is detached from the dome of the railway tank car 71, and the dome fittings carried by the dome of the railway tank car 71 are closed and sealed in a conventional manner.

The body 20 of liquid ammonia is supplied into the storage tank 10 from the interstage tank 30 in the manner previously explained; and at this point it is mentioned that when the head of the body 20 in the storage tank 10 is considered adequate by the operator, the further supply of liquid ammonia from the interstage tank 30 into the storage tank 10 may be terminated by closing the valve 38.

In order to replenish the body 31 of liquid ammonia in the interstage tank 30 it is only necessary to open the valve 47, whereby the liquid ammonia under relatively high pressure is forced from the bottoms of the high pressure storagfe tanks 50 via the pipe 46 into the upper portion of the interstage tank 30. When the operator considers that there is adequate liquid ammonia in the body 31 contained in the interstage tank 30, the valve 47 is reclosed. Of course, an adequate supply of the liquid ammonia under high pressure is maintained in the high pressure storage tanks 50 via the pipe 51 from the adjacent ammonia production plant, not shown.

In a constructional example of the system, the side wall 12 of the tank 10 may have an internal diameter of 110 feet and a height of about 60 feet; whereby the maximum level 21 of the body 20 of the liquid ammonia contained in the tank may correspond to a head of 50 feet. The tube 25 may have an internal diameter of 6 feet, and the open top end thereof may project about 1 foot above the maximum level 21 of the body 20 of liquid ammonia. The booster pump 32 may maintain a gauge pressure of about 0 p.s.i. in the chamber 22, whereby the corresponding temperature of the liquid ammonia at the surface or maximum level 21 of the body 20 is maintained at about −28° F. Since the head of the body 20 may be approximately 50 feet, the gauge pressure of the liquid ammonia in the body 20 at the bottom wall 11 may be 14 p.s.i., so as to establish a corresponding equilibrium temperature thereof of −2° F. Under the conditions of 0 p.s.i.g. and −28° F., the liquid ammonia at the surface or level 21 has a density of approximately 42.50 pounds per cubic foot; and under the conditions of 14 p.s.i.g. and −2° F., the liquid ammonia at the bottom wall 11 has a density of approximately 41.34 pounds per cubic foot. Thus, the density of the liquid ammonia in the top of the tube 25 is greater than the density of the liquid ammonia in the bottom of the tube 25; whereby this differential density of these two portions of the liquid ammonia also induces downward flow of the liquid ammonia in the tube 25. Hence, the downward flow of the liquid ammonia through the tube 25 is produced by the cooperation of the differential head effect, as previously described, and of the differential density effect, as described immediately above.

Continuing with the operation of the constructional example of the system, the liquid ammonia in the body 31 in the interstage tank 30 may be at a gauge pressure of about 30 p.s.i. and at a corresponding temperature of about 17° F. The liquid ammonia in the high pressure storage tanks 50 may be at a gauge pressure of about 215 p.s.i. and at a temperature of about 105° F. The liquid ammonia withdrawn from the bottom of the storage tank 10 has a temperature in the general range −28° F. to −2° F., and ordinarily this liquid ammonia is warmed up to a temperature of about +60° F. before it is loaded into the railway tank car 71.

In view of the foregoing description, it will be understood that when the warm liquid ammonia under relatively high pressure is supplied from the bottom of the interstage tank 30 into the open top end of the tube 25, there is substantial flashing thereof, since the booster pump 32 normally maintains a gauge pressure in the communicating chamber 22 of approximately 0 p.s.i. However, the rate of supply of the warm liquid ammonia through the pipe 37 is regulated by the expansion or throttling valve 38, so as to prevent an undue increase in the gauge pressure of the gaseous ammonia in the chamber 22, thereby to prevent undesirable operation of the pressure relief valve 23 communicating with the chamber 22 and to prevent undesirable overloading of the booster compressor 32. Also, as previously explained, the circulation of the liquid ammonia contained in the storage tank 10 prevents surging of the pressure of the gaseous ammonia in the chamber 22, also to prevent undesirable operation of the pressure relief valve 23 and overloading of the booster compressor 32. Of course, in the event of undue pressure of the gaseous ammonia in the chamber 22, the relief valve 23 is opened automatically, so as to relieve the high pressure condition in order to prevent damage to the storage tank 10, in a conventional manner. The pressure relief valve 45 communicating with the top of the interstage tank 30, of course, serves a like protective function with respect to this tank.

While the present storage system has been described in detail in conjunction with the storage of anhydrous liquid ammonia, it will be understood that the same may be utilized to store a wide variety of products that are also characterized by being in the gas phase under atmospheric pressure and ambient temperature conditions. Such products that are normally stored in the liquid phase under relatively now temperature conditions include liquid nitrogen, liquid oxygen, liquid hydrogen, liquid air, etc.; whereby the products may be readily stored in the present system, although the temperature and pressure ranges involved in such storage are substantially different from those explained above in conjunction with the storage of anhydrous liquid ammonia, as is well understood in cryogenics.

In view of the foregoing it is apparent that there has been provided in a system for storing products in the liquid phase that are in the gas phase under atmospheric pressure and ambient temperature conditions, a storage tank of improved construction, that prevents, or at least greatly minimizes, surging of the stored liquid products of the character noted.

While there have been described what is at present considered to be certain preferred embodiments of the invention, it will be understood that various modifications may be made therein, and it is intended to cover in the appended claims all such modifications as fall within the true spirit and scope of the invention.

What is claimed is:

1. A system for storing in the liquid phase a product that is characterized by being entirely in the gas phase under atmospheric pressure and ambient temperature conditions; said system comprising an upstanding heat-insulated storage tank adapted to contain a body of the product in the liquid phase under substantially atmospheric pressure and relatively low temperature conditions, said storage tank including a top wall and a bottom wall, said top wall being disposed well above the level of the contained body of liquefied product to define a chamber therebetween, an interstage tank, means for withdrawing from said chamber the gaseous product evolved from the contained body of liquefied product and for compressing said gaseous product and for delivering said product to said interstage tank at relatively high temperature and relatively high pressure conditions, thereby to maintain substantially atmospheric pressure of the gaseous product in said chamber and also to maintain said relatively low temperature of the contained body of liquefied product as a consequence of evaporation thereof, the head of the body of liquid product being substantially high to produce a substantial pressure on the liquid product adjacent to said bottom wall, the liquid product being characterized by a relatively higher density at the surface thereof adjacent to said chamber and a relatively lower density adjacent to said bottom wall, an upstanding tube arranged in said storage tank and having an open top end disposed somewhat above the level of the contained body of liquefied product and communicating with said chamber, the lower portion of said tube having passages therein and communicating with the lower portion of the contained body of liquefied product adjacent to said bottom wall, and means for supplying into the open top end of said tube condensate from said interstage tank under relatively high pressure and relatively high temperature conditions, whereby a first portion of the thus supplied condensate is flashed into the gas phase substantially at atmospheric pressure and escapes from the open top end of said tube into said chamber and a second portion of the thus supplied condensate is correspondingly cooled to said relatively low temperature condition and said relatively higher density to provide cooled liquefied product that falls through said tube to produce a flow of the thus cooled liquefied product downwardly through said tube and from the lower portion thereof and via said passages over said bottom wall so as to induce circulation of the liquefied product and upwardly therein and toward the surface thereof adjacent to said chamber, thereby to minimize stagnant pockets of the contained body of liquefied product having a temperature condition substantially above said relatively low temperature condition.

2. The system set forth in claim 1, wherein said upstanding tube is arranged generally in the central portion of said storage tank, and said passages in the lower portion of said tube are disposed in circumferentially spaced-apart relation and directed generally radially outwardly therefrom.

3. A system for storing in the liquid phase a product that is characterized by being entirely in the gas phase under atmospheric pressure and relatively low temperature conditions; said system comprising an upstanding heat-insulated storage tank adapted to contain a body of the product in the liquid phase under substantially atmospheric pressure and relatively low temperature conditions, said storage tank including a top wall and a bottom wall, said top wall being disposed well above the level of the contained body of liquefied product to define a chamber therebetween, an interstage tank, means for withdrawing from said chamber the gaseous product evolved from the contained body of liquefied product and for compressing said gaseous product and for delivering said product to said interstage tank at relatively high temperature and relatively high pressure conditions, thereby to maintain substantially atmospheric pressure of the gaseous product in said chamber and also to maintain said relatively low temperature of the contained body of liquefied product as a consequence of evaporation thereof, the head of the body of liquid product being substantially high to produce a substantial pressure on the liquid product adjacent to said bottom wall, the liquid product being characterized by a relatively higher density at the surface thereof adjacent to said chamber and a relatively lower density adjacent to said bottom wall, an upstanding tube arranged in said storage tank and having an open top end disposed somewhat above the level of the contained body of liquefied product and communicating with said chamber, the lower portion of said tube having passages therein and communicating with the lower portion of the contained body of liquefied product adjacent to said bottom wall, means for supplying into the open top end of said tube condensate from said interstage tank under relatively high pressure and relatively high temperature conditions, whereby a first portion of the thus supplied condensate is flashed into the gas phase substantially at atmospheric pressure and escapes from the open top end of said tube into said chamber and a second portion of the thus supplied condensate is correspondingly cooled to said relatively low temperature condition and said relatively higher density to provide cool liquefied product that falls through said tube to produce a flow of the thus cooled liquefied product downwardly through said tube and from the lower portion thereof and via said passages over said bottom wall so as to induce circulation of the liquefied product and upwardly therein and toward the surface thereof adjacent to said chamber, thereby to minimize stagnant pockets of the contained body of liquefied product having a temperature condition substantially above said relatively low temperature condition, and a pipe communicating with the lower portion of said storage tank for supplying for use liquefied product from the contained body of liquefied product.

4. A system for storing in the liquid phase a product that is characterized by being entirely in the gas phase under atmospheric pressure and ambient temperature conditions; said system comprising an upstanding heat-insulated storage tank adapted to contain a body of the product in the liquid phase under substantially atmospheric pressure and relatively low temperature conditions, said storage tank including a top wall and a bottom wall, said top wall being disposed well above the level of the contained body of liquefied product to define a chamber therebetween, an interstage tank, means for withdrawing from said chamber the gaseous product evolved from the contained body of liquefied product and for compressing said gaseous product and for delivering said product to said interstage tank at relatively high temperature and relatively high pressure conditions, thereby to maintain substantially atmospheric pressure of the gaseous product in said chamber and also to maintain said relatively low temperature of the contained body of liquefied product as a consequence of evaporation thereof, the head of the body of liquid product being substantially high to produce a substantial pressure on the liquid product adjacent to said bottom wall, the liquid product being characterized by a relatively higher density at the surface thereof adjacent to said chamber and a relatively lower density adjacent to said bottom wall, an upstanding tube arranged in said storage tank and having an open top end disposed somewhat above the level of the contained body of liquefied product and communicating with said chamber, the lower portion of said tube having passages therein and communicating with the lower portion of the contained body of liquefied product adjacent to said bottom wall, means for supplying into the open top end of said tube condensate from said interstage tank under relatively high pressure and relatively high temperature conditions, whereby a first portion of the thus supplied condensate is flashed into the gas phase substantially at atmospheric pressure and escapes from the open top end of said tube into said chamber and a second portion of the thus supplied condensate is correspondingly cooled to said relatively low temperature condition and said relatively higher density to provide cooled liquefied product that falls through said tube to produce a flow of the thus cooled liquefied product downwardly through said tube and from the lower portion thereof and via said passages over said bottom wall so as to induce circulation of the liquefied product and upwardly therein and toward the surface thereof adjacent to said chamber, thereby to minimize stagnant pockets of the contained body of liquefied product having a temperature condition substantially above said relatively low temperature condition, a heater, a pipe communicating with the lower portion of said tank for supplying liquefied product from the contained body of liquefied product into said heater, said heater being operative to warm the liquefied product supplied thereto, and means for supplying for use the thus warmed liquefied product from said heater.

5. A system for storing anhydrous liquid ammonia; said system comprising an upstanding heat-insulated storage tank adapted to contain a body of anhydrous liquid ammonia under substantially atmospheric pressure and relatively low temperature conditions, said storage tank including a top wall and a bottom wall, said top wall being disposed well above the level of the contained body of anhydrous liquid ammonia to define a chamber therebetween, an interstage tank, means for withdrawing from said chamber the gaseous ammonia evolved from the contained body of anhydrous liquid ammonia and for compressing said gaseous product and for delivering said product to said interstage tank at relatively high temperature and relatively high pressure conditions, thereby to maintain substantially atmospheric pressure of the gaseous ammonia in said chamber and also to maintain said relatively low temperature of the contained body of anhydrous liquid ammonia as a consequence of evaporation thereof, the head of the anhydrous liquid ammonia being on the order of at least about 50 feet to produce a substantial pressure on the anhydrous liquid ammonia adjacent to said bottom wall, the anhydrous liquid ammonia being characterized by a relatively higher density at the surface thereof adjacent to said chamber and a relatively lower density adjacent to said bottom wall, an upstanding tube arranged in said storage tank and having an open top end disposed somewhat above the level of the contained body of anhydrous liquid ammonia and communicating with said chamber, the lower portion of said tube having passages therein and communicating with the lower portion of the contained body of anhydrous liquid ammonia adjacent to said bottom wall, and means for supplying into the open top end of said tube condensate from said interstage tank under relatively high pressure and relatively high temperature conditions, whereby a first portion of the thus supplied condensate is flashed into gaseous ammonia substantially at atmospheric pressure and escapes from the open top end of said tube into said chamber and a second portion of the thus supplied condensate is correspondingly cooled to said relatively low temperature condition and said relatively higher density to provide cooled anhydrous liquid ammonia that falls through said tube to produce a flow of the thus cooled anhydrous liquid ammonia downwardly through said tube and from the lower portion thereof and via said passages over said bottom wall so as to induce circulation of the contained body of anhydrous liquid ammonia upwardly therein and toward the surface thereof adjacent to said chamber, thereby to minimize stagnant pockets of the contained body of anhydrous liquid ammonia having a temperature condition substantially above said relatively low temperature condition.

6. A system for storing anhydrous liquid amonnia; said system comprising an upstanding heat-insulated storage tank adapted to contain a body of anhydrous liquid ammonia under substantially atmospheric pressure and relatively low temperature conditions, said tank including a top wall and a bottom wall, said top wall being disposed well above the level of the contained body of anhydrous liquid ammonia to define a chamber therebetween, the head of the contained body of anhydrous liquid ammonia being at least about 50 feet so that the gauge pressure thereof adjacent to said bottom wall is at least about 14 pounds per square inch in order to produce an equilibrium temperature thereof at least as high as about $-2°$ F., means for withdrawing from said chamber the gaseous ammonia evolved from the contained body of anhydrous liquid amonnia, thereby to maintain a guage pressure of the gaseous ammonia in said chamber of about 0 pounds per square inch so as to maintain the contained body of anhydrous liquid ammonia at the surface thereof adjacent to said chamber at a temperature of approximately $-28°$ F. as a consequence of the evaporation thereof, an upstanding tube arranged in said tank and having an open top end disposed somewhat above the level of the contained body of anhydrous liquid ammonia and communicating with said chamber, the lower portion of said tube having passages therein communicating with the lower portion of the contained body of anhydrous liquid ammonia adjacent to said bottom wall, and means for supplying into the open top end of said tube the anhydrous liquid ammonia under relatively high pressure and relatively high temperature conditions, whereby a first portion of the thus supplied anhydrous liquid ammonia is flashed into gaseous ammonia substantially at 0 pounds per square inch gauge pressure and escapes from the open top end of said tube and into said chamber and a second portion of the thus supplied anhydrous liquid ammonia is correspondingly cooled to approximately $-28°$ F. and falls through said tube to produce a flow of the thus cooled anhydrous liquid ammonia downwardly through said tube and from the lower portion thereof and via said passages over said bottom wall so as to induce circulation of the contained body of anhydrous liquid ammonia upwardly therein and toward the surface thereof adjacent to said chamber, whereby to minimize stagnating pockets of the contained body of anhydrous liquid ammonia having a temperature condition substantially above said relatively low temperature condition.

7. A system for storing anhydrous liquid ammonia; said system comprising an upstanding heat-insulated storage tank adapted to contain a body of anhydrous liquid ammonia under substantially atmospheric pressure and relatively low temperature conditions, said tank including a top wall and a bottom wall, said top wall being disposed well above the level of the contained body of anhydrous liquid ammonia to define a chamber therebetween, the head of the contained body of anhydrous liquid ammonia being sufficiently high to produce a relatively higher density of the contained body of anhydrous liquid ammonia adjacent to said bottom wall of about 41.3 pounds per cubic foot, means for withdrawing from said chamber the gaseous ammonia evolved from the contained body of anhydrous liquid ammonia, thereby to maintain a gauge pressure of the gaseous ammonia in said chamber that is sufficiently low to produce a relatively lower density of the contained body of anhydrous liquid ammonia at the surface thereof adjacent to said chamber of about 42.5 pounds per cubic foot and also to maintain said relatively low temperature of the contained body of anhydrous liquid ammonia as a consequence of evaporation thereof, an upstanding tube arranged in said tank and having an open top end disposed somewhat above the level of the contained body of anhydrous liquid ammonia and communicating with said chamber, the lower portion of said tube having passages therein communicating with the lower portion of the contained body of anhydrous liquid ammonia adjacent to said bottom wall, and means for supplying into the open top end of said tube the anhydrous liquid ammonia under relatively high pressure and relatively high temperature conditions, whereby a first portion of the thus supplied anhydrous liquid ammonia is flashed into gaseous ammonia substantially at atmospheric pressure and escapes from the open top end of said tube and into said chamber and a second portion of the thus supplied anhydrous liquid ammonia is correspondingly cooled to said relatively low temperature condition and said relatively higher density condition, whereby the anhydrous liquid ammonia of relatively higher density in the upper portion of said tube falls downwardly therethrough and effects displacement of the anhydrous liquid ammonia of relatively lower density from the lower portion of said tube via said passages over said bottom wall so as to assist in inducing circulation of the contained body of anhydrous liquid ammonia upwardly therein and toward the surface thereof adjacent to said chamber, whereby to minimize stagnant pockets of the contained body of anhydrous liquid ammonia having a temperature condition substantially above said relatively low temperature condition.

References Cited by the Examiner

UNITED STATES PATENTS

| | | | |
|---|---|---|---|
| 2,550,886 | 5/51 | Thompson | 62—54 |
| 2,640,627 | 6/53 | Doelter | 62—54 |
| 2,938,360 | 5/60 | Christensen | 62—54 |
| 3,079,760 | 3/63 | Maher | 62—54 |
| 3,098,362 | 7/63 | Sohda et al. | 62—54 |

ROBERT A. O'LEARY, *Primary Examiner.*